US005624882A

United States Patent [19]

Gane

[11] Patent Number: 5,624,882

[45] Date of Patent: Apr. 29, 1997

[54] COLOR DEVELOPER COMPOSITIONS FOR CARBONLESS PAPER COPYING SYSTEMS

[75] Inventor: Patrick A. C. Gane, Callington, United Kingdom

[73] Assignee: ECC International Limited, United Kingdom

[21] Appl. No.: 250,178

[22] Filed: May 27, 1994

[30] Foreign Application Priority Data

May 28, 1993 [GB] United Kingdom .................. 9311088

[51] Int. Cl.[6] .......................... B41M 5/155; C09D 11/00

[52] U.S. Cl. .................. 503/207; 106/31.18; 106/31.17; 503/209; 503/214; 503/225

[58] Field of Search ............................. 106/21 E, 22 C; 503/207, 225; 427/150–152

[56] References Cited

FOREIGN PATENT DOCUMENTS

WO93/09289 5/1993 WIPO .................................. 503/207

*Primary Examiner*—B. Hamilton Hess
*Attorney, Agent, or Firm*—Klauber & Jackson

[57] ABSTRACT

There is disclosed a coating composition for the preparation of a CF sheet (i.e. a receiving sheet) of a carbonless paper copying system comprising a CF sheet and a CB sheet (i.e. a donating sheet). The coating composition comprises a color developer and an extender, wherein the extender comprises a particulate inorganic material which has been modified by treatment with a treating agent which has (i) a non-polar hydrophobic portion comprising at least one hydrocarbon group having a chain length of from 8 to 30 carbon atoms and (ii) a polar portion which is capable of binding with sites on the surface of the pigment particles.

25 Claims, No Drawings

COLOR DEVELOPER COMPOSITIONS FOR CARBONLESS PAPER COPYING SYSTEMS

BACKGROUND OF THE INVENTION

1. Field of the Invention

This invention relates to colour developer compositions used to develop images in pressure-sensitive carbonless paper copying systems. This invention also relates to colour developer sheets for carbonless paper copying systems and to multiple carbonless paper copying systems comprising such colour developer sheets.

2. Description of the Prior Art

Pressure-sensitive carbonless paper copying systems have captured a very large market on account of their convenience compared with carbon paper copying. Carbonless paper copying systems comprise a multiple set made up of a matched pair, or a plurality of matched pairs, of sheets, generally of paper, of which one is a donating sheet and the other is a receiving sheet. When written upon, the donating sheet is pressed into contact with the receiving sheet, and an image substantially identical to the writing develops on the receiving sheet.

This image development is brought about by the contact of a colourless dye precursor, i.e. a colour former, present on the donating sheet with a colour developer present on the receiving sheet. Generally, a solution of the colour former in a solvent is encapsulated in microcapsules and coated on to the back face of the donating sheet (the CB sheet), which will generally have an uncoated front face. Typical colour formers, often termed "leuco dyes", are, for example, triphenylmethanes (such as Crystal violet lactone), xanthenes (such as N-102 fluoran) and thiazines (such as benzoyl leucomethylene blue). The colour developer is generally coated on the front face of the receiving sheet (the CF sheet). When the CB and CF sheets are placed in contiguous relationship with the colour developer adjacent to the colour former and pressure, such as from a writing instrument, typewriter or the like, is applied, the microcapsules are crushed and the released colour former solution is adsorbed onto the CF sheet where it contacts the colour developer. The image on the CF sheet develops from a chemical transformation of the colour former to a coloured form, caused by the colour developer. In general, this chemical transformation entails an acid-base type reaction wherein the colour former changes from an uncharged colourless state to a positively charged coloured state.

Alternatively, the colour former microcapsules and the colour developer can be coated onto the same sheet, or the colour developer can be on the CB sheet and the colour former microcapsules can be on the CF sheet. For convenience, hereinafter, "CB sheet" refers to a sheet, generally a paper sheet, coated with the colour former solution in microcapsules, and "CF sheet" refers to a sheet, generally a paper sheet, coated with a colour developer.

Currently, two types of colour developers are in wide use. The first type comprises the well known phenolic resins, generally low molecular weight compounds obtained by polymerising formaldehyde or the like and a diphenolic compound. Their use has several drawbacks. Firstly, they must be subjected to a long and complicated milling process to produce resins of specified particle size distributions suitable for use in carbonless paper copying systems. Secondly, they can decompose, particularly during milling and on the coated sheet, to release formaldehyde, a lachrymator and irritant now implicated as a possible human carcinogen. Thirdly, phenolic resins give a yellowish background to the CF sheet. This results in a deeper background colour for the writing image, which is accordingly of poorer quality. Finally, phenolic resins do not develop high image densities because they are of limited solubility in the colour former solution. This again results in poor image quality.

Monomeric phenols, including Bisphenol A and like bisphenols, are also known in the art as colour developers and components of colour developer compositions.

The second widely used type of colour developer comprises acid-treated clays, and they too are not without their drawbacks. Firstly, since the colour developing activity of an acid treated clay depends on the extent to which exchangeable cations in the clay are replaced by hydrogen to form colour developer sites on the clay surface, the clay must be carefully treated with a strong mineral acid. Secondly, to ensure a good quality image, sufficient contact between the colour solution and the colour developer sites on the clay surface is needed. The problem of achieving adequate contact between the colour former and the acid clay is analogous to the problem of low image density which results from the limited solubility of phenolic resins in the colour former solution. Image quality is highly sensitive to the chemistry and morphology of an acid clay, yet these parameters are very difficult to control. Nevertheless, it is generally considered necessary in order to obtain good image quality that the colour developer should be constituted, at least in the greater part, by such an acid clay.

CF sheets are prepared by coating a suspension of the colour developer and conventional coating additives such as adhesives, dispersants, protective colloids and the like, on to a sheet and letting the coating dry. High solids concentrations, which include high solids contents of the colour developer and any additive in the coating colour, are desirable for good image quality. However, concentrations above about 45–50% by weight are generally unattainable with phenolic resins or acid clays used alone or in predominant amounts as the colour developer, because of the poor rheology, or high viscosity, of coating compositions containing them.

It has been found that the rheological properties of a coating composition for a CF sheet may be improved by diluting or extending the colour developer with a substantially electrochemically inactive inorganic material such as a kaolinitic clay, a calcined kaolinitic clay, a natural or precipitated calcium carbonate, a natural or synthetic calcium sulphate or a talc. Typical coating compositions comprise from about 40% to about 98% by weight of the extender and from about 2% to about 60% by weight of the colour developer which may be an acid clay, a phenolic resin, a monomeric phenol, or a combination of any two or of all three of these types.

In addition to the requirement that a combination of a CB sheet and a CF sheet should be capable of producing an image of good quality when pressed upon by a writing, typewriting or printing instrument, it is also generally necessary for the sheets to be capable of receiving a good print image when printed by a conventional printing process, such as the web offset process or the sheet offset process. This property is necessary because the combination of the CB sheet and the CF sheet is generally required to bear verbal and/or graphic elements of a standard form.

Difficulties have been experienced in printing CF sheets, or webs of CF sheet material, by the offset process in that the printing ink is absorbed quickly into the sheet and dries undesirably rapidly, with the result that the ink becomes tacky and tends to adhere to the blanket of the offset printing press and accumulate thereon. This accumulation of highly tackified ink can also lead to removal of coating from the paper to create yet greater accumulation of material on the blanket. This problem is believed to be due to the structure of the CF sheet, which is deliberately made to be of high porosity in order to encourage good wetting of the colour developer by the solvent of the colour former, and by the strong adherence of the tacky ink to the coating surface. The accumulation of tacky ink on the blanket of an offset printing press is often known in the printing industry as "ink piling", and the removal by the tacky ink of coating pigment from the coated paper is known as "picking".

International Patent Application No. WO-93/09289 concerns a paper coating composition for preparing a coated paper for use in a gravure printing process, which paper coating composition contains a particulate inorganic paper-coating pigment which has been modified by treatment with a treating agent which renders the pigment surfaces hydrophobic or enhances their hydrophobicity. The treating agent has a non-polar hydrophobic portion comprising at least one hydrocarbon group having a chain length of from 8 to 30 carbon atoms and a polar portion which is capable of binding with sites on the pigment surfaces. The quantity of the treating agent used is from 0.05% to 5.0%, preferably from 0.1% to 2.0% by weight, based on the weight of the pigment. Evidence is given that the use of the coating composition makes it possible to prepare a coated paper which gives improved gravure printing results, and especially improved gravure print quality, print gloss and print density.

Thus, International Patent Application No. WO-93/09289 discloses that the treatment, with a treating agent of the type described, of a pigment of a paper coating composition will render the surfaces of the pigment hydrophobic and will enhance certain of the gravure printing properties of a coated paper prepared from the composition.

SUMMARY OF THE INVENTION

In accordance with the present invention, we have now discovered that, surprisingly, the treated inorganic material, when incorporated as an extender into a coating composition for a CF sheet for carbonless paper copying system, makes it possible for the CF sheet to receive an acceptable print image by an offset printing process, without an undesirable accumulation of printing ink and coating pigment on the blanket of the offset printing press, and, at the same time, to provide an acceptable image when pressure is applied by a writing, typewriting or printing instrument to a combination of the CF sheet with a CB sheet.

According to the present invention, there is provided a coating composition for the preparation of a CF sheet of a carbonless paper copying system comprising a CF sheet and a CB sheet, the coating composition comprising a colour developer and an extender, wherein the extender comprises a particulate inorganic material which has been modified by treatment with a treating agent which has (i) a non-polar hydrophobic portion comprising at least one hydrocarbon group having a chain length of from 8 to 30 carbon atoms and (ii) a polar portion which is capable of binding with sites on the surface of the pigment particles.

Preferably, the coating composition further comprises an adhesive and/or dispersing agent. The coating composition is usually in the form of an aqueous suspension.

DETAILED DESCRIPTION

The present invention thus provides an extender for a coating composition for preparing a CF sheet for carbonless paper copying system comprising a combination of a CB sheet and a CF sheet, which extender comprises a particulate inorganic material which has been modified by treatment with a treating agent, prior to incorporation in the coating composition, wherein the treating agent employed to treat the particles of the particulate inorganic material has a non-polar hydrophobic portion comprising at least one hydrocarbon group having a chain length of from 8 to 30 carbon atoms and a polar portion which is capable of binding with sites on the surface of the pigment particles.

The present invention thus provides an extender which, when incorporated in a coating composition for a CF sheet for a carbonless paper copying system, substantially overcomes the problem of excessively rapid ink absorption during offset printing of the surface of the sheet, thus reducing the effect of adherence of the tacky ink to the coating surface, but which makes it possible to maintain good quality of the image which is formed when pressure is applied to a combination of a CB sheet and the CF sheet.

The coating composition can be an aqueous suspension which conveniently comprises 100 parts by weight of a mixture of a colour developer and the extender and from 4 to 20 parts by weight of an adhesive, which may be, for example, a styrene-butadiene latex, an acrylic latex, a starch or a proteinaceous adhesive. The mixture of colour developer and the extender conveniently comprises from 40% by weight to 98% by weight of the extender and from 2% by weight to 60% by weight of a colour developer, which may be an acid clay, a phenolic resin, a monomeric phenol, or a combination of any two or of all three of these types. Preferably at least 50% by weight of the mixture is constituted by the extender. The coating composition will also generally include a dispersing agent for the colour developer and the extender.

The dispersing agent may be, for example, a water soluble salt of a phosphoric acid, a water soluble salt of a polysilicic acid, a water soluble salt of a poly(acrylic acid) or a poly(methacrylic acid) or a water soluble salt of an alkyl sulphate or an alkyl sulphonate wherein the alkyl group has a chain length of from 8 to 20 carbon atoms. The dispersing agent may also comprise a mixture of any two or more of the above types. The dispersing agent is preferably selected to give optimum performance with a particular colour developer and with a particular extender. For example, when the extender is a natural calcium carbonate treated with stearic acid, the preferred dispersing agent is either sodium dodecyl sulphate, or a water soluble salt of a poly(acrylic acid) or of a poly(methacrylic acid) or a combination of these two types of dispersing agent. The quantity of dispersing agent used is preferably in the range from 0.05% to 2.0% by weight, based on the weight of the mixture of colour developer and extender.

The particulate inorganic material may be, for example, kaolin or china clay, natural or synthetic aluminium or calcium silicate, natural or precipitated calcium carbonate, satin white, natural or synthetic calcium sulphate or talc. Preferably the quantity of the treating agent used is from 0.05% to 5.0% by weight, based on the weight of the inorganic material. Most preferably, the amount of the treating agent is from 0.1% to 2.0% by weight, based on the weight of the inorganic material.

The polar portion of the treating agent which is capable of binding with sites on the surfaces of the inorganic material may bind either directly or indirectly by means of, for example, an intermediate material which binds the site on the inorganic material surface with the polar portion of the treating agent. The treating agent may be capable of binding with the site on the inorganic material either in aqueous suspension or in a dry mix with the inorganic material. The precise nature of the polar portion of the treating agent must be determined empirically. However, in some cases, it may be possible to infer an appropriate surface treatment agent from a knowledge of the surface chemistry of the inorganic material. For example, it is currently thought that amines bind to the surface of kaolin by electron donation into electron acceptor sites on the kaolin surfaces, or by protonation via the hydroxyl groups on the kaolin surfaces.

Some of the suitable inorganic materials, typically natural or synthetic silicates, and especially kaolin, have surfaces which have a number of acidic sites. In accordance with the present invention, these inorganic materials are preferably treated with a primary, secondary or tertiary amine which has at least one hydrocarbon group having a chain length of from 8 to 30 carbon atoms, since organic nitrogen-containing compounds of this type have a polar portion from which electron donation to the electron acceptor sites on the clay may take place. A quaternary ammonium compound having at least one hydrocarbon group with a chain length of from 8 to 30 carbon atoms may also be used to treat natural or synthetic silicates and aluminosilicates, although the mechanism of binding in this case is uncertain. Examples of suitable amines and quaternary ammonium compounds include primary octadecylamine, primary hydrogenated tallow amine, trimethyl hydrogenated tallow ammonium chloride and dimethyl di(hydrogenated tallow) ammonium chloride.

On the other hand, calcium carbonate, which is another suitable inorganic material, is preferably treated with a treating agent such as a saturated or unsaturated fatty acid having at least one hydrocarbon group of chain length from 8 to 30 carbon atoms. Such fatty acids include stearic acid, palmitic acid and oleic acid.

The invention will now be illustrated by the following Example.

EXAMPLE

Two coating compositions for a CF sheet for a carbonless paper copying system, each comprising 100 parts by weight of a mixture consisting of 60% by weight of a colour developer and 40% by weight of an extender, 17.9 parts by weight of styrene-butadiene latex adhesive solids, and 1.5 parts by weight of dry sodium hydroxide, were prepared.

In each case the colour developer consisted of an acid reacted bentonite clay of a type which is widely used in preparing coating compositions for CF sheets for carbonless paper copying systems.

In coating composition A, in accordance with the invention, the extender consisted of a treated ground natural calcium carbonate which had a particle size distribution such that 60% by weight of the particles had an equivalent spherical diameter smaller than 2 μm. The calcium carbonate was surface treated by grinding with 1% by weight, based on the weight of dry calcium carbonate, of stearic acid. The treated calcium carbonate was suspended in water containing 0.5% by weight, based on the weight of dry calcium carbonate, of a sodium polyacrylate dispersing agent having a number average molecular weight of 3,200.

In coating composition B, for comparison, the extender consisted of an untreated ground natural calcium carbonate which had a particle size distribution such that 80% by weight of the particles had an equivalent spherical diameter smaller than 2 μm. The calcium carbonate was suspended in water containing 0.5% by weight, based on the weight of dry calcium carbonate, of the same dispersing agent as was used for preparing the pigment for coating composition A.

In each case the colour developer was mixed in aqueous suspension with the extender and the latex adhesive was mixed in. The pH of the suspension was then adjusted with the sodium hydroxide. The resultant composition was coated on to an appropriate base sheet material for preparing a CF sheet and the coating was dried.

It was found that, in each case, CF sheets prepared in the manner described above gave good image quality when combined with a conventional CB sheet and subjected to pressure from a writing instrument.

CF sheets prepared using each of the two coating compositions were printed by an offset printing process, and, in each case, the tackiness of the ink transferred to the coated CF sheet was measured by a procedure in which a nitrile rubber roller was brought into contact with the wet print and the force required to separate the roller from the inked sheet was measured by means of a strain gauge. Thirteen measurements of this force were made at approximately three second intervals as the ink dried. The results are set forth in Table 1 below:

TABLE 1

| Coating Composition A | | Coating Composition B | |
|---|---|---|---|
| Time (sec.) | Force | Time (sec.) | Force |
| 3.6 | 90 | 3.7 | 104 |
| 6.7 | 89 | 6.8 | 104 |
| 9.8 | 88 | 10.0 | 98 |
| 13.0 | 86 | 13.2 | 94 |
| 16.0 | 85 | 16.3 | 94 |
| 19.2 | 81 | 19.6 | 98 |
| 22.4 | 76 | 22.7 | 87 |
| 25.5 | 81 | 25.9 | 86 |
| 28.6 | 76 | 29.1 | 90 |
| 31.8 | 78 | 32.3 | 78 |
| 35.0 | 79 | 35.4 | 83 |
| 38.2 | 76 | 38.7 | 80 |
| 41.3 | 66 | 41.9 | 77 |

These results show that the CF sheet which had been coated with composition A exhibits significantly lower ink tackiness than the sheet which had been coated with composition B.

In each case the blanket of the offset printing press was examined visually on completion of a printing run in an image, or inked, area, and the appearance of this area was compared with a series of graded and numbered photographs which corresponded to a range of different degrees of piling. The degree of piling which occurred during the print run was determined by identifying the photograph which represented a degree of piling which was just worse than the piling which occurred during the print run and the photograph which represented a degree of piling just better than the piling which occurred during the print run and assigning a value which was midway between the numbers of the two photographs. This procedure was performed a total of five times for each of the coating compositions and an average value obtained for each composition. The average degree of piling for composition A, in accordance with the invention, was 2.1 and the average degree of piling for composition B, for comparison, was 3.3. These results show that less piling occurs with composition A than with composition B.

I claim:

1. A coating composition for the preparation of a CF sheet of a carbonless paper copying system comprising a CF sheet and a CB sheet, said coating composition comprising a color developer and an extender, said extender comprising a particulate inorganic material which has been modified by treatment with a treating agent which has (i) a non-polar hydrophobic portion comprising at least one hydrocarbon group having a chain length of 8 to 30 carbon atoms and (ii) a polar portion which is capable of binding with sites on the surface of the pigment particles, wherein said particulate inorganic material is selected from the group consisting of natural or synthetic aluminum or calcium silicate, natural or precipitated calcium carbonate, satin white, natural or synthetic calcium sulfate and talc.

2. A coating composition according to claim 1, comprising 40 to 98% by weight of said extender and 2 to 60% by weight of said color developer, based on the total weight of said extender and said color developer.

3. A coating composition according to claim 1, further comprising an adhesive.

4. A coating composition according to claim 3, wherein said adhesive is selected from the group consisting of a styrene-butadiene latex, an acrylic latex, a starch and a proteinaceous adhesive.

5. A coating composition according to claim 3, comprising 4 to 20 parts by weight of said adhesive per 100 parts of the total amount of said extender and said color developer.

6. A coating composition according to claim 1, further comprising a dispersing agent.

7. A coating composition according to claim 6, wherein said dispersing agent is selected from the group consisting of a water soluble salt of phosphoric acid, a water soluble salt of a polysilicic acid, a water soluble salt of a poly (acrylic acid) or a poly (methacrylic acid), a water soluble salt of an alkyl sulfate and an alkyl sulfonate wherein the alkyl group contains 8 to 20 carbon atoms.

8. A coating composition according to claim 6, comprising 0.05 to 2.0% by weight of said dispersing agent, based on the total weight of said extender and said color developer.

9. A coating composition according to claim 1, wherein said treating agent is selected from the group consisting of a primary, secondary or tertiary amine, a quaternary ammonium compound and a fatty acid.

10. A coating composition according to claim 1, wherein said color developer is selected from the group consisting of an acid clay, a phenolic resin and a monomeric phenol.

11. A coating composition according to claim 1, wherein said composition is present in the form of an aqueous suspension.

12. A CF sheet for said carbonless paper copying system which has been coated with a coating composition according to claim 1.

13. A coating composition for the preparation of a CF sheet of a carbonless paper copying system comprising a CF sheet and a CB sheet, said coating composition comprising a color developer and an extender, said extender comprising a particulate inorganic material which has been modified by treatment with a treating agent which has (i) a non-polar hydrophobic portion comprising at least one hydrocarbon group having a chain length of 8 to 30 carbon atoms and (ii) a polar portion which is capable of binding with sites on the surface of the pigment particles, wherein said color developer is selected from the group consisting of an acid clay, a phenolic resin and a monomeric phenol.

14. A coating composition according to claim 13, comprising 40 to 98% by weight of said extender and 2 to 60% by weight of said color developer, based on the total weight of said extender and said color developer.

15. A coating composition according to claim 13, further comprising an adhesive.

16. A coating composition according to claim 15, wherein said adhesive is selected from the group consisting of a styrene-butadiene latex, an acrylic latex, a starch and a proteinaceous adhesive.

17. A coating composition according to claim 15, comprising 4 to 20 parts by weight of said adhesive per 100 parts of the total amount of said extender and said color developer.

18. A coating composition according to claim 13, further comprising a dispersing agent.

19. A coating composition according to claim 18, wherein said dispersing agent is selected from the group consisting of a water soluble salt of phosphoric acid, a water soluble salt of a polysilicic acid, a water soluble salt of a poly (acrylic acid) or a poly (methacrylic acid), a water soluble salt of an alkyl sulfate and an alkyl sulfonate wherein the alkyl group contains 8 to 20 carbon atoms.

20. A coating composition according to claim 18, comprising 0.05 to 2.0% by weight of said dispersing agent, based on the total weight of said extender and said color developer.

21. A coating composition according to claim 13, wherein said particulate inorganic material is selected from the group consisting of natural or synthetic aluminum or calcium silicate, natural or precipitated calcium carbonate, satin white, natural or synthetic calcium sulfate and talc.

22. A coating composition according to claim 13, wherein said treating agent is selected from the group consisting of a primary, secondary or tertiary amine, a quaternary ammonium compound and a fatty acid.

23. A coating composition according to claim 13, wherein said color developer is selected from the group consisting of an acid clay, a phenolic resin and a monomeric phenol.

24. A coating composition according to claim 13, wherein said composition is present in the form of an aqueous suspension.

25. A CF sheet for said carbonless paper copying system which has been coated with a coating composition according to claim 13.

* * * * *